United States Patent [19]

Bernardin et al.

[11] Patent Number: 5,415,295

[45] Date of Patent: May 16, 1995

[54] METHOD AND DEVICE FOR AUTOMATICALLY SORTING NUCLEAR-FUEL PELLETS

[75] Inventors: Michel Bernardin, Claix; Paul Bouvet, Vinay; Claude Wache, Romans, all of France

[73] Assignee: Société Franco-Belge de Fabrication De Combustibles, France

[21] Appl. No.: 174,299

[22] Filed: Dec. 28, 1993

[30] Foreign Application Priority Data

Dec. 29, 1992 [FR] France ................ 92 15846

[51] Int. Cl.$^6$ .......................... B07C 5/00; B65G 47/26
[52] U.S. Cl. ................................. 209/587; 209/919; 209/936; 198/433; 198/468.3; 198/478.1
[58] Field of Search ............... 209/523, 524, 538, 559, 209/561, 564, 576, 587, 903, 909, 919, 936; 198/433, 468.3, 470.1, 478.1, 481.1; 356/237, 426

[56] References Cited

U.S. PATENT DOCUMENTS

| | | | |
|---|---|---|---|
| 3,811,567 | 5/1974 | Tomita et al. | 209/524 X |
| 4,119,211 | 10/1978 | Boyer et al. | 198/468.3 X |
| 4,648,235 | 3/1987 | Oberdorf | 209/936 X |
| 4,697,691 | 10/1987 | Zodrow et al. | 198/433 X |
| 5,186,887 | 2/1993 | Yaginuma | 356/426 X |

FOREIGN PATENT DOCUMENTS

| | | |
|---|---|---|
| 330348 | 8/1989 | European Pat. Off. |
| 2389096 | 11/1978 | France |
| 2638983 | 5/1990 | France |
| 2667398 | 4/1992 | France |

*Primary Examiner*—James R. Bidwell
*Assistant Examiner*—Tuan N. Nguyen
*Attorney, Agent, or Firm*—Pollock, Vande Sande & Priddy

[57] ABSTRACT

The automatic sorting device allows nuclear-fuel pellets to be distributed into correct, acceptable or scrapped pellets. It comprises: a station for presenting pellets, which is intended to move n strings of pellets simultaneously along parallel paths until the n terminal pellets are at longitudinally offset taking locations an input and orientation turret fitted with grippers for simultaneously seizing the n terminal pellets and making them rotate in order to align them, this turret being rotary about an axis between a position in which the grippers are at the taking locations and a position in which they are at a transfer station; an inspection turret fitted with a station for receiving n pellets at the same time, this being rotary between a position in which the station is at the transfer location, a position located at an inspection station, and an output position; a unit for simultaneous optical examination of the n pellets placed at the inspection station; and an assembly for individually taking and distributing the pellets in batches.

10 Claims, 6 Drawing Sheets

METHOD AND DEVICE FOR AUTOMATICALLY SORTING NUCLEAR-FUEL PELLETS

BACKGROUND OF THE INVENTION

The present invention relates to the inspection of cylindrical nuclear-fuel pellets, typically having a uranium oxide base, which are used in fuel rods for nuclear reactors, with a view to detecting their surface defects and assigning the pellets to different classes depending on the nature and the significance of such defects.

The method most used to date to sort the pellets consists in examining them visually and in distributing them manually between various batches, for example those constituted by correct pellets, pellets acceptable for fuel rods assigned to regions of the reactor where the neutron flux is less, and pellets to be rejected and recycled to the start of the manufacturing process.

This manual operation is laborious and slow. Operator fatigue may lead to errors after a certain time. Finally, there is a risk of contamination, in particular when the pellets are produced from reprocessed and/or plutonium-containing fuel.

Various nuclear-fuel pellet inspection devices have already been proposed. In particular, FR-A-2,638,983 describes an apparatus for handling and for external inspection of pellets allowing each pellet in turn to be brought to a location where it is rotated about its axis, so as to allow examination along successive generatrices. Such a device, the actual examination means of which are not described, does not seem to allow a high sorting rate to be achieved.

SUMMARY OF THE INVENTION

It is an object of the invention to provide an automatic sorting device and method allowing a high rate to be achieved and capable of being implemented in a completely automatic manner.

With this object in mind, the invention proposes a method wherein:
- n parallel strings of pellets (n being an integer greater than 1) are pushed in order to bring the n terminal pellets of the strings in abutment into positions longitudinally offset from each other,
- the n terminal pellets are seized at the same time with the aid of grippers which are rotated in order to align the pellets,
- the n aligned pellets are simultaneously transferred onto an inspection table which is brought beneath an optical inspection unit,
- the pellets are simultaneously rotated in order to examine them with the aid of the optical inspection unit,
- the light signals supplied for each pellet by the optical inspection unit are processed,
- the n pellets are simultaneously seized with the aid of individual grippers and of a set of grippers,
- the individual grippers carrying the n pellets are all moved together along a path which causes them pass in succession to at least one station for receiving correct pellets, where the grippers carrying the correct pellets are opened, and another station where the pellets to be rejected are released, the control of the opening of the grippers being effected as a function of the processed signals.

There is also provided a device comprising:
- a station for discharging and for presenting pellets, which is intended to move n strings of pellets simultaneously (n being an integer greater than 1) along paths parallel to the direction of the strings until the n terminal pellets are at longitudinally offset taking locations,
- an input and orientation turret fitted with means for simultaneously seizing the n terminal pellets at the taking locations and making them rotate in order to bring them into mutual alignment, the turret being rotary about an axis between a position in which the seizing means are at the taking locations and a position in which they are at a transfer station,
- an inspection turret fitted with means for receiving n pellets at the same time and rotating them simultaneously, this being rotary between a position in which the reception means are at the transfer locations, a position located at an inspection station, and an output position,
- an optical inspection device fitted with means of simultaneous optical examination of the n pellets placed at the examination station, and
- an assembly for individually taking the pellets to the position for outputting and distributing them in batches according to the assignment given by the optical examination means.

The invention will be better understood on reading the description which follows of a particular embodiment, given by way of example.

DETAILED DESCRIPTION

Figure 1:
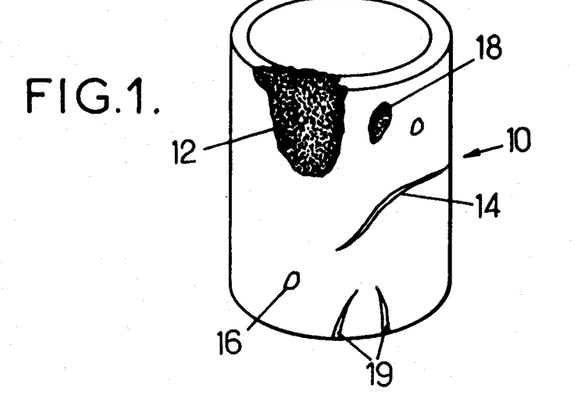
FIG. 1 is a schematic perspectives representation of a nuclear-fuel pellet having defects liable to be encountered in reality.

FIG. 1 shows schematically a fuel pellet 10 of the type currently used in nuclear reactors. A correct pellet is in the form of a cylinder, the periphery of which is ground and the terminal faces of which have a concave central recess and, possibly, a chamfer 30. FIG. 1 shows defects liable to be encountered. These are, for example, a chip 12, a crack 14, a pit 16, a metallic inclusion 18, ungulate cracks 19.

The device which will now be described allows pellets to be examined and distributed into several categories, which, in the case of the device which will be described by way of example, include a batch of correct pellets, a batch of acceptable pellets and a batch of rejected pellets.

Figures 2, 5:
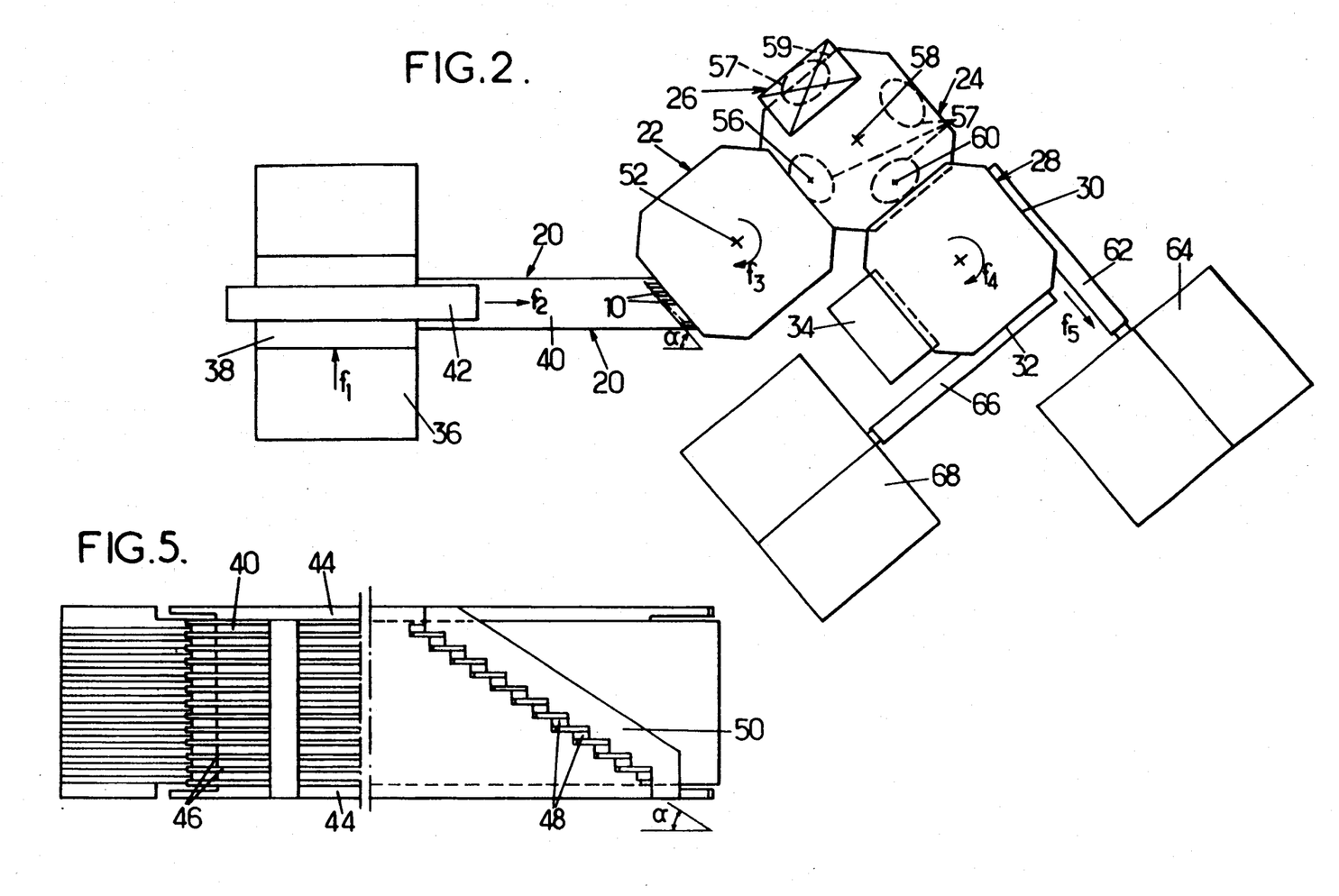
FIG. 2 is a schematic plan view of the general arrangement of the components of a device for automatically sorting pellets according to a particular embodiment.
FIG. 5 is a plan view showing schematically the conveyor belt and the discharge station of the device of FIG. 2.
Figure 3:
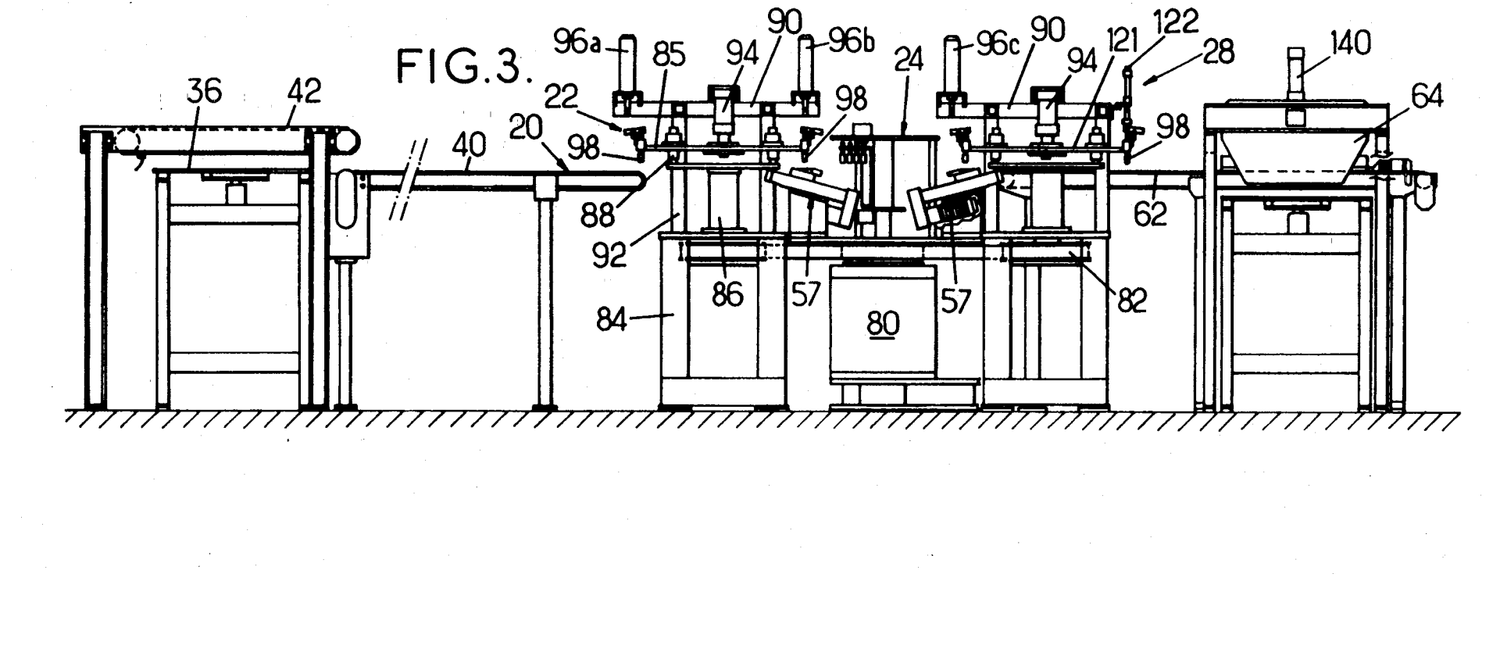
FIG. 3 is a schematic view, in elevation, showing the components of the device of FIG. 2, these being represented in alignment for the sake of clarity, rather than in their actual relative arrangement.

The device illustrated in FIGS. 2 and 3 may be regarded as including:
- a discharge and presentation station 20,
- an input and orientation turret 22,
- an inspection turret 24,
- an optoelectronic assembly 26,
- a taking-up and distributing assembly having an output turret 28 provided for depositing the pellets individually at a station 30 for receiving correct pellets, at a station 32 for receiving acceptable pellets and into a container 34 for receiving defective pellets.

These various components will now be described in succession, firstly in their general construction and then in a particular embodiment.

Discharge and Presentation Station

The discharge and presentation station shown in FIGS. 2 and 3 includes a table 36 for receiving rectangular shelves 38 containing pellets arranged in strings, for example in twenty five strings of forty pellets each. The table is fitted with means enabling the shelf to move progressively in the direction of the arrow f1 so as to bring every time n strings of pellets into a position facing a conveyor belt 40. Moveable means, constituted in the case of FIG. 3 by an endless belt 42 fitted with fingers, allow n strings to be pushed at the same time towards the conveyor belt in the direction of the arrow f2. The conveyor belt is provided to bring the n pellets at the head of the strings to taking locations which are offset from each other and aligned in a direction oblique in relation to f2, i.e., in relation to the direction of the strings. The conveyor belt 40 is controlled by a motor (not shown), which makes it possible to give it a speed slightly greater than that of the endless belt 42 and to stop the conveyor belt if necessary, for example when n pellets occupy the taking positions. The conveyor belt 40 forms an intermediate storage allowing the input and orientation turret to be continuously fed, while an emptied shelf is replaced by a loaded shelf.

Figure 4:
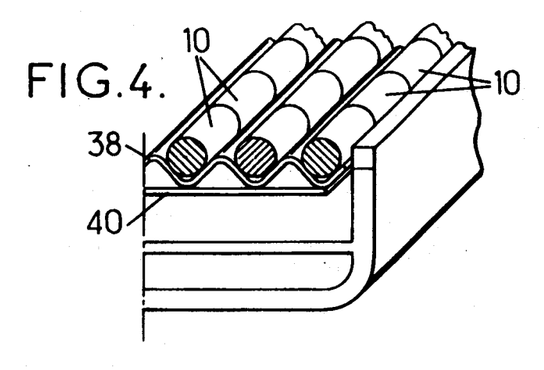
FIG. 4 is a perspective diagrammatic view showing the transfer of the pellets towards a feed conveyor belt at the discharge station of the device of FIG. 2.

FIGS. 4 and 5 show that the strings of pellets may be kept at the suitable spacing in the shelves 38 by giving the latter an undulated shape or other appropriate shapes. Flanges 44 and guides 46 may be provided above the conveyor belt 40 in order to keep the strings at the suitable spacing. The longitudinally offset taking locations may be physically represented by stops 48 (FIG. 5). These stops 48 may be mounted on a single support 50 allowing especially the angle $\alpha$ between the alignment direction of the pellets and the conveyor belt to be adjusted.

Figure 6:
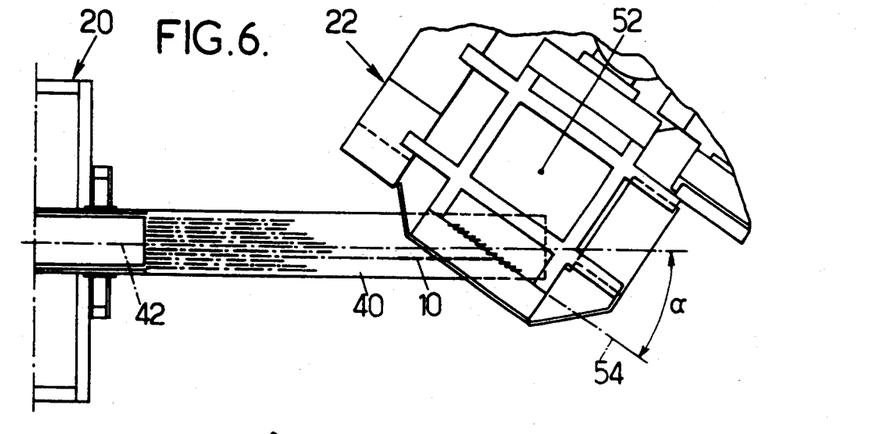
FIG. 6 is a plan view showing, in a simplified manner, a portion of the input and orientation turret and the conveyor belt for feeding the pellets.
Figure 6A:
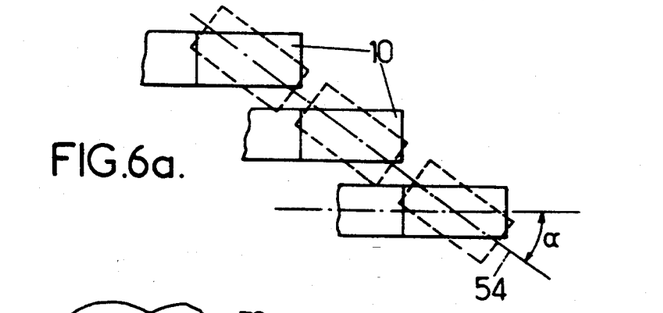
FIG. 6A is a diagram on an enlarged scale showing the change in orientation of the pellets brought about by the seizing means.

The function of the input and orientation turret 22 is to seize n pellets simultaneously at the taking locations, to make them rotate through the angle $\alpha$ in order to bring them into alignment (i.e., to cause them to pass from the position shown in solid lines to the position shown in dashed lines in FIG. 6A) and then to bring them to a transfer station where they will be put down by the inspection turret 24. The possibility of simultaneous rotation of the pellets is obtained by laterally offsetting the axis of the turret 52 in relation to the conveyor belt 40. The location of the stops for retaining the pellets at the taking locations is such that these pellets may be seized by grippers, which will be described later, arranged along a line 54, the mean perpendicular of which passes through the axis 52.

In order to allow a high rate of operation, the turret 22 includes not just one set of n grippers, but four sets angularly distributed at 90° with respect to each other about the axis of the turret, thus allowing one set to be at the locations for taking n pellets 10, while another set of grippers lies at a station 56 for transferring towards the inspection turret 24. In the case shown in FIG. 2, the transfer station 56 is placed on the opposite side of the taking locations in relation to the axis 52 and the turret 22 is provided in order to adopt four successive angular positions when the turret rotates in the direction indicated by the arrow f3. The pellets then remain temporarily in a stand-by position, these being angularly spaced apart by 90° in relation to the taking locations and to the station for transferring and depositing the pellets.

Inspection Turret

The inspection turret 24 is provided for receiving n aligned pellets at the same time, these being brought to the transfer station 56 by the input turret 22. In the case illustrated in FIG. 2, this turret may itself also adopt four angular position, spaced apart by 90°, about an axis 58. It carries at least four inspection tables 57 likewise distributed at 90° about the axis 58 of the turret. During successive 90° rotations of the turret, each table 57 passes in succession by the transfer station 56, an inspection station 59, a stand-by position and an output position 60, forming an interface with the output turret 28 belonging to the take-up and distribution assembly. The tables 57 are provided for simultaneously receiving n pellets, as will be seen later.

Each table 57 (FIGS. 3 and 7) includes an inclined stage 74, fitted with means allowing it to be given a to-and-fro movement in the direction of its inclination, intended to receive the n aligned pellets, and a fixed strip 76 for pressing on the pellets. The moveable stage 74 is formed so that its coefficient of friction is higher than that on the fixed strip 76. The inclination of the movable stage is chosen so as to bring about a uniform and precise rotation of the pellets 10 which it carries, for example a rotation of one revolution per second.

Assembly for the Individual Taking-Up and Distributing of the Pellets

The principal component of this assembly is the output turret 28 itself also comprising at least one set of n grippers (four uniformly distributed sets in the particular case which will be described). The n grippers of the same set are individually controllable as a function of the results of the examination effected at the inspection station 59 by the optical inspection unit 26. During the rotation of the output turret in the direction of the arrow f4, each set passes in succession, starting from the output position 60:

to the station 30 for receiving correct pellets, where the grippers carrying such pellets open and release the pellets onto a conveyor 62 for bringing the pellets onto a reception shelf 64;

to the station 32, from where a conveyor 66 brings the acceptable pellets onto a shelf 68; and to above the container 34, where the remaining grippers open in order to release the defective and rejected pellets.

It would be possible to provide a different number of classes and to modify the order of depositing the pellets as a function of their class.

Optoelectronic Assembly

Figure 7:
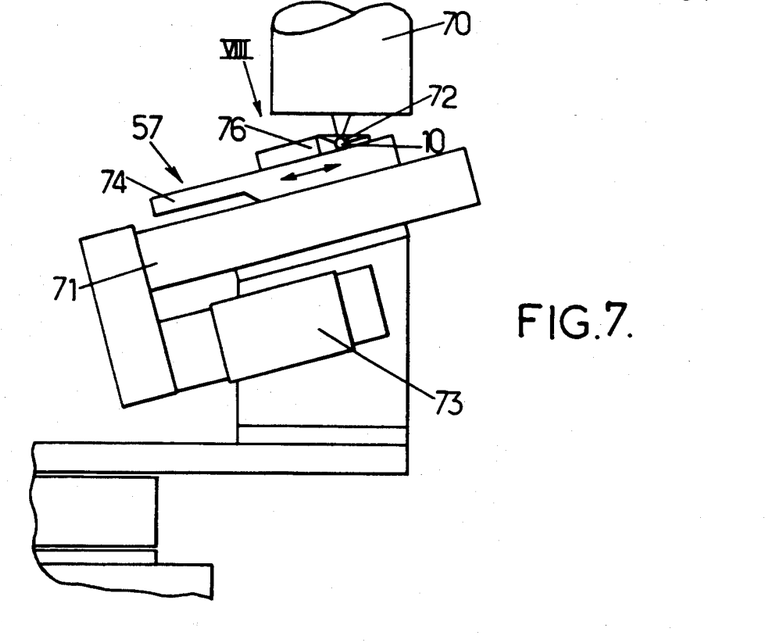
FIG. 7 is a schematic view in elevation showing the station for inspecting the pellets.

The optoelectronic assembly 26 is advantageously of the kind described in the patent application, filed on the same day as the present application, for "Optical method and device for automatically classifying cylindrical nuclear-fuel pellets". FIG. 7 shows the optical inspection unit 70 of such an assembly, placed at the examination station so as to observe a generatrix 72 of the lateral surface of all the pellets. Sets of grippers and tables processing n=12 pellets at the same time and an optical inspection unit 70 formed by four separate sensors each observing three pellets may especially be provided.

The rate at which images are taken by the sensors is slaved to the speed of rotation of the pellets, this itself being fixed by the speed of movement of the stage 74, and the image of the pellet is built up, generatrix by generatrix, each time over a width of a few hundredths of a millimeter.

The movements of the stage 74 may be controlled by an electric motor 73 through the intermediary of a gear train and a worm which are placed in a casing 71.

Figure 8:
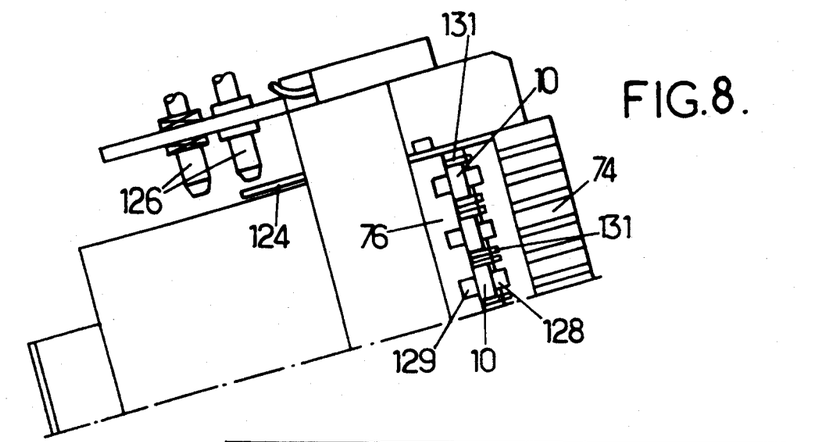
FIG. 8 is a plan view of a portion of the station for inspecting the pellets, seen in the direction of the arrow VIII of FIG. 7.

FIG. 8 shows a portion of a stage allowing n=12 pellets to be received, which are spaced apart from each other so that the optical inspection unit 70, formed for example by four sensors each observing three pellets, can pick up defects at the ends even when the pellets are not chamfered. The movable stage 74 carries a finger 124 interacting with sensors 126 allowing the movement of the stage to be determined. In the fixed strip 76 and in the movable stage 74 are made respective recesses 129 and 128 allowing the jaws of the grippers to seize the pellets 10 and to release them without shock. Projections 131 may be provided for holding the pellets longitudinally.

An automatic-control, signal-processing and computing unit (not shown) controls the operation of all the mechanical and optical components and processes the measurement signals supplied by the optical inspection unit 70.

As is shown in FIG. 3, in order to assure synchronous operation of the various turrets, the same motor 80 may be provided for driving them with the aid of a notched belt 82. All the mechanical parts are supported above ground by a support frame 84.

Each of the components described hereinabove may have various constructions. One construction of each of these components which has been shown to be particularly advantageous will now be described.

The input and presentation turret 22 (FIGS. 3 and 9) includes a stage 85 carrying the sets of grippers. This stage is driven in rotation by a hub 86 to which it is attached by vertical guide columns 88. An actuator carrier 90 is held above the stage 85 by risers 92 fastened to the support frame 84. A central actuator 94 connects the actuator carrier 90 to the stage 85 and allows the stage 85 to be brought to a down gripping position and an up position for transporting the pellets. Two lateral actuators 96a and 96b are respectively provided for bringing about the forced closure of the grippers at the discharge and presentation station 20 and the opening of the grippers at the transfer station 56.

Figure 9:
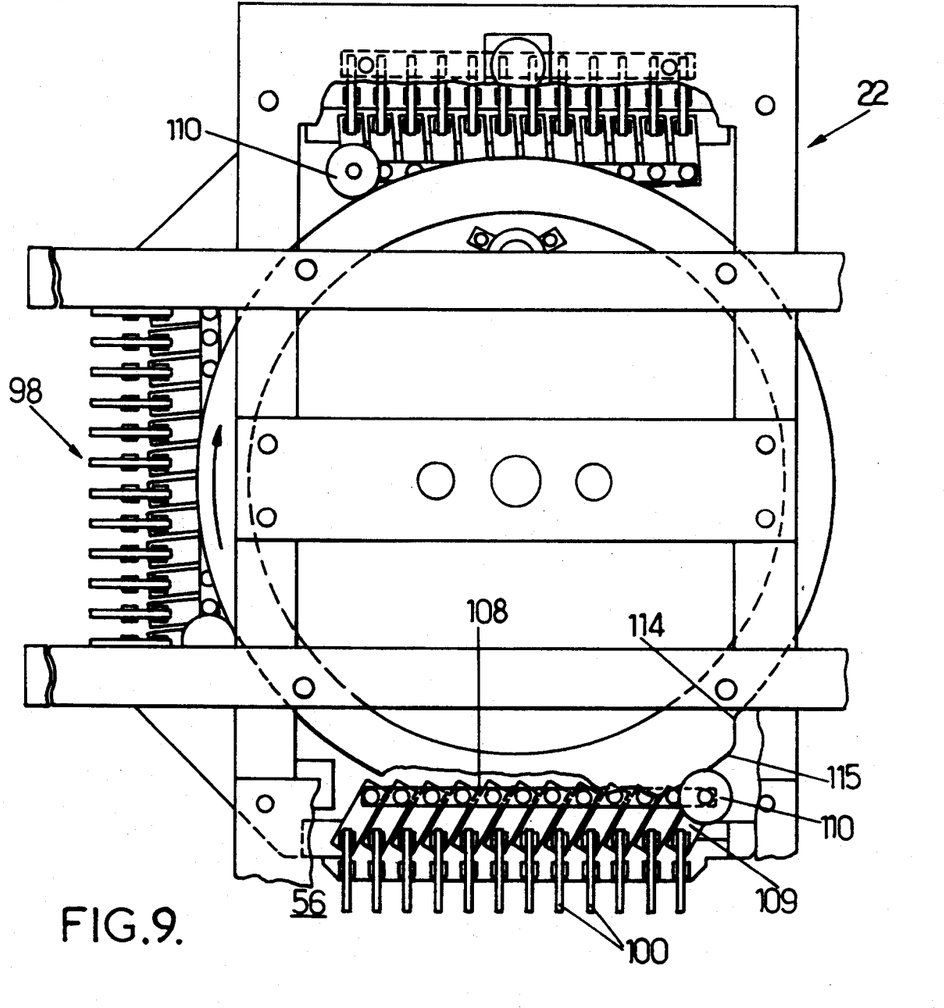
FIG. 9 is a plan view showing a possible construction of the input and orientation turret of the device of FIG. 2.
Figures 10, 11, 12:
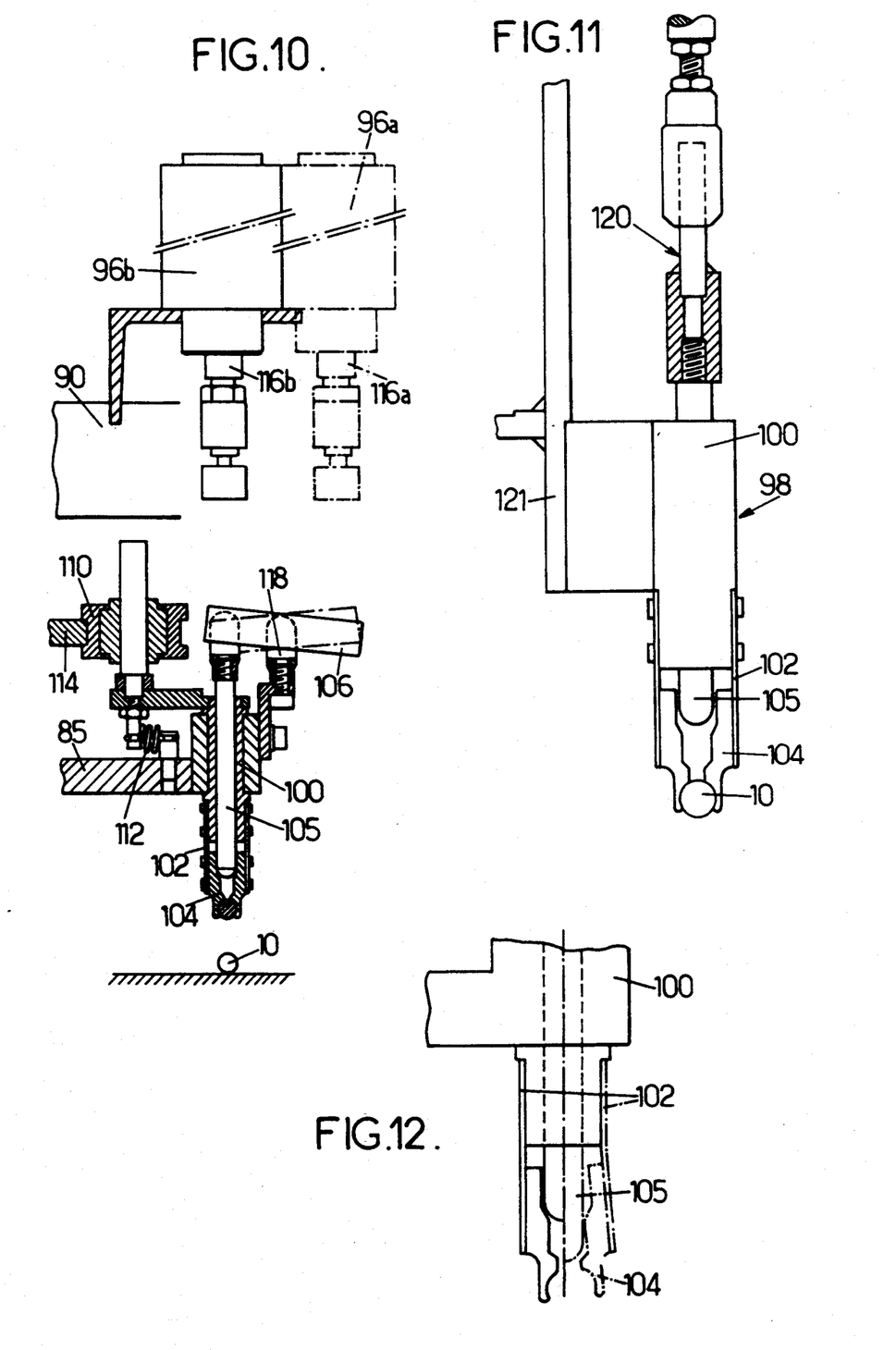
FIG. 10 is a view in elevation and in partial vertical section of the mechanisms allowing a gripper to be opened and closed.
FIG. 11 is a view in elevation, on a large scale, of a gripper belonging to the means for simultaneously shelving n pellets.
FIG. 12 shows, in elevation, a portion of the gripper of FIG. 10, in the rest position (in solid lines) and in a position for taking a pellet (in dot-dash lines)

FIG. 9 shows three of the four sets of n=12 grippers 98, each of which may have the general construction shown in FIG. 10. The gripper then has a body 100 to which two resilient blades 102 carrying jaws 104 are fastened. The gripper body 100 is mounted in the stage 85 so as to be able to rotate about its axis through the angle $\alpha$ (FIG. 6A). It is hollow and contains a control core 105 which can move between a down position of forced opening of the jaws 104 and an up position in which it allows the jaws to be closed up under the action of the springy blades 102 (FIG. 12).

Means are provided for causing all the grippers of the same set to rotate simultaneously through the angle $\alpha$ and for bringing about the simultaneous opening or closing of all the grippers of the set.

To this end, the top end of each gripper body 100 is articulated on a link rod 109 which connects it to a common coupling bar 108. The end of the bar 108 carries a roller 110 held by a spring 112 pressed down against a cam 114 having a projecting part.

The projecting part 115 has an angular position, an angular development and a projection which are such that it provides the grippers 98 with the orientation necessary to seize n offset pellets placed at the discharge and presentation station and that it forces the grippers to assume the orientation where the n pellets are aligned when the stage 85 arrives close to the deposition orientation. However, the change in orientation of the grippers may involve another location.

The mechanism for simultaneously opening and closing the grippers 98 of the turret 22 is represented in detail in FIG. 10 where the closing actuator 96a (in dot-dash lines) and the opening actuator 96b are represented side by side, whereas, in reality, they are respectively at the transfer location and at the discharge and presentation station.

Each actuator includes a body fastened to the actuator carrier 90 and a rod 116a or 116b which can move vertically between the rest position in which it is shown in FIG. 10 and an active down position.

The actuator 96b is placed so as to make the rocker arms 106 tilt about respective yokes 118 and to push the cores 105 in, in order to open the jaws when it is powered. Reciprocally, the actuator 96a brings about the closure of the grippers located at the transfer station by raising their core 105 when it is powered.

The lower end of the core is rounded and the jaws 104 have an internal profile allowing the grippers 98 to be opened progressively so that the pellets are deposited without shock. The constituent materials of the core 105 and of the jaws 104 are advantageously treated in order to retard their wear. Finally, the internal shape of the jaws is such that they embed the pellet sufficiently for it to remain in place as long as possible during the raising and lowering movements of the cores 105.

The output turret 28 is similar to the turret 22, but its grippers are provided so that their opening is individually controlled and not as a set, whereas their closing is controlled altogether, as for the turret 22.

FIG. 11, where the elements corresponding to those already described bear the same reference number, shows one of the grippers 98 of the output turret 28. The body 100 of the gripper is fastened to the rotating stage 121 (FIG. 3) of the turret and its core 105 is fitted with a control linkage 120. The actuator carrier 90 of the output turret 28 is fitted, above the output position, with a single actuator 96c intended to close all the grippers of one set on the pellets occupying the inspection table which lies at this position. It also includes a single actuator (not shown) placed above the container 34, intended to open all the grippers which are still closed. Finally, above the reception stations 30 and 32 (FIG. 2), it has two respective sets of n individual actuators 122 (FIG. 3). These actuators allow correct pellets and acceptable pellets to be selectively released onto respective conveyors 62 and 66.

Figure 13:
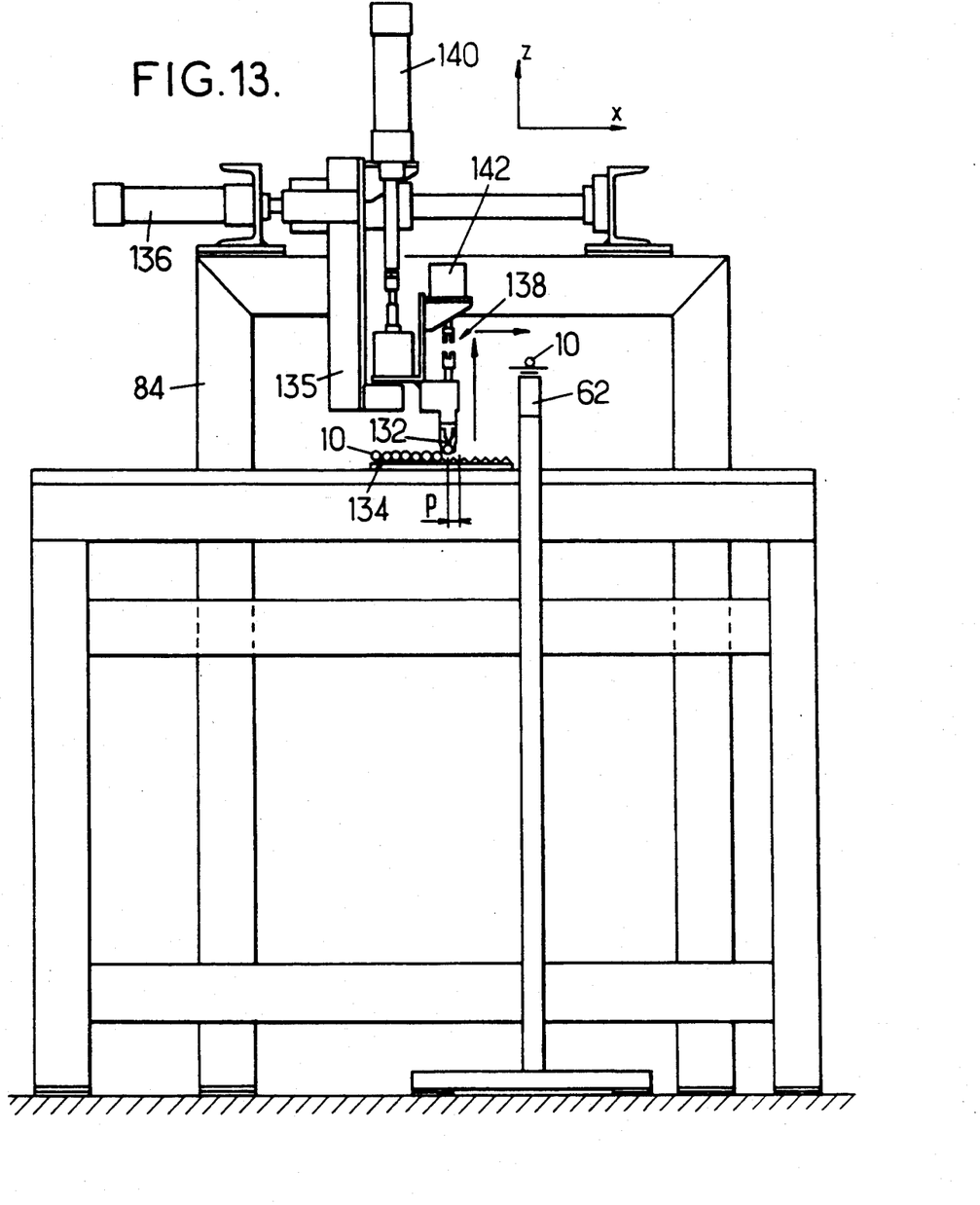
FIG. 13 is a view in elevation showing a possible construction of that part of the assembly for distributing the pellets which is assigned to the formation of batches of correct or acceptable pellets.

FIG. 13 shows a portion of the shelving assembly 64 which allows the correct pellets deposited at the reception station 30 to be brought together in batches arranged on shelves each containing a defined number of pellets. The assembly 68 assigned to the station 32 may have the same construction.

The take-up assembly deposits a random number of pellets, all aligned, onto the belt of the conveyor 62 which, by its movement in the direction of the arrow f5 (FIG. 2) forms a string of pellets pressed up against a stop (not shown). A gripper 132, carried by the support frame 84 by the agency of maneuvering means, includes jaws of a profile similar to that of the jaws 104, but of a length corresponding to the number m of pellets to be installed in each of the parallel reception channels provided with a spacing p (greater than the diameter of the pellets) on a shelf 134. The gripper 132 consequently makes it possible to pick up a string of m pellets at the same time and to transfer it into a channel.

The maneuvering means must allow the gripper to move horizontally in the direction x transverse to the direction of movement of the conveyor 62, and vertically in the direction z. The maneuvering means shown in FIG. 13 comprise, for this purpose, a mounting plate 135 for moving in the horizontal direction x which is also transverse to the channels of the shelf 134 to be loaded. An actuator 136 carried by the support frame 84 controls the movements in the direction x. The mounting plate itself includes a gripper-carrier assembly 138 which can move vertically (direction z) by means of an actuator 140. The body of the gripper 132 is fastened to this assembly, which is also fitted with an actuator 142 for opening and closing the gripper.

The method which the device makes it possible to implement will now be described in a succinct manner because it stems directly from the structure of the device. The numerical values will be given only by way of example.

The pellets to be checked are brought on shelves 38 carrying, for example, twenty-five rows of forty pellets. The shelf carrying the pellets to be checked is put down on the table 36 which allows the shelf to be moved laterally with a shift corresponding to twelve strings of pellets. The twelve strings to be checked during one step are pushed towards the conveyor belt 40 in the direction f2.

The input and orientation turret 22 may adopt four working orientations. In each of these orientations, the grippers of one set are arranged above twelve pellets at a presentation station and their jaws are oriented in order to correspond to the direction of the pellets. A second set is at a stand-by location, a third is at the transfer station and a fourth is at a stand-by station.

The sequence of the operations, starting from a given orientation and while the stage 85 is held in the up position by the central actuator 94 is as follows.

The actuator 94 lowers the stage down to a position in which the grippers 98, which are then open and located at the presentation station, flank twelve pellets. The grippers 98 located at the transfer station 56, which are then closed, put down twelve pellets on the table 57 which lies at the same station. The actuators 96a and 96b are controlled, taking the pellets located at the presentation station 20 and releasing the pellets onto the inspection table 57. The actuator 94 then raises the stage and the latter rotates through one quarter of a revolution under the action of the motor 80, at the same time as the turrets 24 and 28. This 90° rotation brings the inspection table 57, which has just received pellets, to the inspection station 59 and brings an empty inspection table to the presentation station. While this inspection table is being loaded, the twelve pellets located at the inspection station are checked. The sensor sends the signals obtained to the signal-processing, computing and automatic-control unit, (not shown).

The rate of the inspection operation may be n pellets (n being the number of pellets per station) in a time less than 3 seconds (position and processing).

At the following cycle, the inspection table is brought to the output position 60 where the twelve pellets are seized by a set of grippers 98 of the output turret 28. The vertical movements of the gripper-carrier stage 121 of the output turret may be controlled like those of the gripper-carrier stage 85 of the input and orientation turret 22. During the three following cycles, the correct pellets are deposited at the station 30, the acceptable pellets are deposited at the station 32 and the rejected pellets are dropped into the container 34. The individual actuators 122 are electrically controlled by the signal-processing, computing and automatic-control unit which can process signals corresponding to a set of pellets during the time necessary for transferring this set of pellets from the inspection station to the station 30 for receiving the correct pellets.

The invention is capable of numerous variants and, for example, the mechanical grippers may be replaced by gripping means of another type, such as suckers. Another variant comprises three turrets each including three stations for distributing the pellets into correct and incorrect classes only.

We claim:

1. Method for automatically sorting cylindrical nuclear-fuel pellets, comprising the steps of:
   moving n parallel strings of pellets, n being an integer greater than 1, to bring n terminal pellets of the strings in abutment into positions longitudinally offset from each other,
   seizing said n terminal pellets at the same time with gripping means and rotating the gripping means to mutually align said n terminal pellets, simultaneously transferring the n aligned pellets onto an inspection table and bringing said table beneath an optical inspection unit, simultaneously rotating the pellets while examining them with said optical inspection unit, processing light signals returned to the optical inspection unit by each pellet, simultaneously seizing the n pellets with individual grippers of a set of grippers, and moving the individual grippers carrying the n pellets as a whole along a path which makes them pass in succession to at least one station for receiving correct pellets, where the grippers carrying correct pellets are opened, and to at least one other station where pellets to be rejected are released, the opening of said grippers being controlled as a function of the processed signals.

2. Device for automatically sorting cylindrical nuclear-fuel pellets, comprising:

a station for discharging and for presenting pellets, which is constructed to move n strings of pellets simultaneously, n being an integer greater than 1, along paths parallel to the direction of the strings until n terminal pellets are at longitudinally offset taking locations, an input and orientation turret fitted with means for simultaneously seizing the n terminal pellets at the taking locations and making them rotate in order to bring them into mutual alignment, said turret being rotary about an axis between a position in which said seizing means are at the taking locations and a position in which said seizing means are at a transfer station, an inspection turret fitted with means for receiving n pellets at the same time and rotating them simultaneously, said inspection turret being rotary between a position in which said reception means are at the transfer locations, a position located at an inspection station, and an output position, an optical examination station fitted with means of simultaneous optical examination of the n pellets placed at the inspection station, and an assembly for individually taking the pellets to the position for outputting and distributing these pellets in batches according to the assignment given by the optical examination means.

3. Device according to claim 2, wherein the individual taking and distributing assembly comprises a rotary output turret carrying a set of n individually-controlled grippers and means for selectively opening, at a reception station, the grippers carrying pellets indicated as being correct by the optical examination means and means for opening the grippers remaining at a location for receiving defective pellets.

4. Device according to claim 3, wherein the output turret also includes means for opening the grippers carrying acceptable pellets to a second reception station.

5. Device according to claim 2, wherein the station for discharging and presenting pellets includes a conveyor belt allowing the n terminal pellets of n strings of pellets to be brought to said taking locations distributed along a segment, a mean perpendicular of which passes through the axis of rotation of the input and orientation turret.

6. Device according to claim 2, wherein said input and orientation turret comprises a plurality of sets of n grippers, uniformly distributed angularly on a rotating stage, all the grippers having a rotary body in the stage and all the gripper bodies being connected together so as to rotate simultaneously under the action of a fixed cam when the stage rotates, for example when the set of grippers reaches the discharge and presentation station.

7. Device according to claim 6, wherein each of the grippers includes a core which is adapted to move between a position of forced opening of the grippers and a closed position, and wherein the input and orientation turret is associated with fixed actuators for closing the grippers at the discharge and presentation station and for opening the grippers at the transfer station.

8. Device according to claim 2, wherein the inspection turret includes a rotary stage carrying at least three inspection tables uniformly distributed angularly so as to come in succession to the inspection station, each table comprising an inclined stage for receiving n pellets and fitted with means making it possible to impose a back-and-forth movement on it, and a fixed strip for retaining the pellets, allowing these pellets to rotate about their axis.

9. Device according to claim 8, wherein the examination station comprises a fixed optical inspection unit for observing a generatrix of the n aligned pellets.

10. Device according to claim 2, further comprising a signal-processing, computing and automatic-control unit, controlling all the turrets, processing the signal supplied by the optical examination unit and controlling the assembly for distributing the pellets.

* * * * *